United States Patent
Sano et al.

(10) Patent No.: US 11,905,946 B2
(45) Date of Patent: Feb. 20, 2024

(54) BACKUP RING AND LIQUID FEEDING PUMP USING BACKUP RING

(71) Applicant: Shimadzu Corporation, Kyoto (JP)

(72) Inventors: Toshiki Sano, Kyoto (JP); Shinya Imamura, Kyoto (JP); Masataka Nikko, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 304 days.

(21) Appl. No.: 16/183,806

(22) Filed: Nov. 8, 2018

(65) Prior Publication Data

US 2020/0149636 A1 May 14, 2020

(51) Int. Cl.
| | |
|---|---|
| *F04B 53/02* | (2006.01) |
| *F04B 53/14* | (2006.01) |
| *F04B 53/16* | (2006.01) |
| *F04B 17/00* | (2006.01) |
| *F04B 19/22* | (2006.01) |

(52) U.S. Cl.
CPC ............ *F04B 53/143* (2013.01); *F04B 17/00* (2013.01); *F04B 19/22* (2013.01); *F04B 53/02* (2013.01); *F04B 53/162* (2013.01)

(58) Field of Classification Search
CPC ...... F04B 17/03; F04B 17/042; F04B 17/044; F04B 53/02; F04B 53/143; F04B 53/162; F04B 17/00; F04B 19/22; F04B 53/164; F16J 15/00; F16J 15/32; F16J 15/004; F16J 15/002; F16J 15/3276; F16J 15/3216; F16J 15/3224
See application file for complete search history.

(56) References Cited

U.S. PATENT DOCUMENTS

| | | | | |
|---|---|---|---|---|
| 2012/0031264 | A1* | 2/2012 | Aso ....................... | F04B 53/162 |
| | | | | 92/88 |
| 2012/0288386 | A1* | 11/2012 | Aso ....................... | F04B 53/143 |
| | | | | 417/437 |
| 2013/0323103 | A1* | 12/2013 | Shreve .................. | F04B 1/0448 |
| | | | | 417/437 |
| 2014/0260565 | A1 | 9/2014 | Imamura et al. | |
| 2016/0356381 | A1* | 12/2016 | Henmi ................... | F16J 15/26 |
| 2017/0067561 | A1* | 3/2017 | Alam ..................... | F16J 15/022 |

FOREIGN PATENT DOCUMENTS

| | | | |
|---|---|---|---|
| JP | 2001254686 A | 9/2001 | |
| JP | 2005-273581 A | 10/2005 | |
| JP | 2005273581 A | * 10/2005 ............ B60T 8/4031 |
| WO | 2013/089147 A1 | 6/2013 | |

OTHER PUBLICATIONS

Office Action dated Jul. 9, 2019, in corresponding Japanese Application No. 2016-105682; 6 pages.

* cited by examiner

Primary Examiner — Essama Omgba
Assistant Examiner — Chirag Jariwala
(74) *Attorney, Agent, or Firm* — Maier & Maier, PLLC

(57) ABSTRACT

A backup ring is for contacting with and supporting a plunger seal which is for sealing a pump chamber provided in a pump head of a plunger type liquid feeding pump. The backup ring includes a maximum outer diameter portion of a cylindrical shape and a smaller outer diameter portion. The maximum outer diameter portion includes a maximum outer diameter in a plunger seal supporting surface side that makes contact with a rear surface of the plunger seal. The smaller outer diameter portion includes a smaller outer diameter than the maximum outer diameter portion in at least one part of a portion other than the maximum outer diameter portion.

4 Claims, 2 Drawing Sheets

BACKUP RING AND LIQUID FEEDING PUMP USING BACKUP RING

FIELD

The present invention relates to a backup ring used to support a rear surface of a plunger seal that seals a pump chamber in a plunger type liquid feeding pump, and a liquid feeding pump equipped with the backup ring.

BACKGROUND

The plunger type liquid feeding pump continuously carries out intake and discharge of liquid to and from a pump chamber by reciprocating the plunger in one direction while slidably moving a distal end of a plunger in the pump chamber provided in a pump head. The pump head is removably attached to a distal end portion of a pump body, and a drive unit that drives the plunger is arranged on a pump body side. A cross head reciprocated in one direction by, for example, a cam mechanism, and the like is accommodated in the pump body, where a basal end of the plunger is held by the cross head.

A distal end of the plunger is projected out toward the pump head side from the distal end of the pump body, and inserted into the pump chamber of the pump head. A plunger seal made of resin that closely attaches to and holds the outer periphery of the plunger is arranged at a plunger inserting portion to the pump chamber of the pump head for the purpose of preventing liquid leakage from the pump chamber toward the pump body.

As the liquid feeding pump used in a high speed liquid chromatograph becomes liquid feeding high pressure, high pressure is applied on the plunger seal, and the plunger seal may deform and cause problems of abrasion and degradation. To prevent such problems, a backup ring is arranged on the rear surface (surface on the side opposite the pump chamber) of the plunger seal to support the rear surface of the plunger seal and prevent the deformation of the plunger seal (see patent document 1).

Patent document 1: Japanese Unexamined Patent Publication No. 2001-254686

SUMMARY

When a liquid feeding pressure exceeds 100 MPa, the plunger seal is deformed by the high pressure, where one part of the plunger seal enters between the outer surface of the plunger and the inner surface of the backup ring, thus causing problems such as degrading the plunger seal and inhibiting the drive of the plunger. Therefore, the inner diameter of the backup ring is designed so that a gap between the plunger and the backup ring becomes as small as possible.

The position of a center axis of the plunger at the time of liquid feeding is normally determined by the position of the plunger seal closely attaching to and holding the outer peripheral surface of the plunger. However, if the center position of the backup ring and the center position of the plunger seal are shifted, the outer surface of the plunger may come into contact with the inner surface of the backup ring when the plunger is reciprocated and the position of the center axis of the plunger may shift from the center position of the plunger seal, whereby the plunger may not make contact with the inner surface of the plunger seal with an even force and the inner surface of the plunger seal may be partially abraded. Furthermore, abrasion powder of the plunger and the backup ring may be produced when the plunger comes into contact with the backup ring, and the abrasion powder may enter between the plunger and the plunger seal, thus making the lifespan of the plunger seal extremely short. Therefore, the center of the plunger seal and the center of the backup ring are desirably coaxial.

The backup ring is fitted to a recess arranged on a surface on the pump body side of the pump head. If a dimensional difference of the outer diameter of the backup ring and an inner diameter of the recess of the pump body is large, the position of the backup ring does not stabilize by such difference, and positional shift of the backup ring with respect to the plunger seal easily occurs. If the dimensional difference of the outer diameter of the backup ring and the inner diameter of the recess of the pump body is reduced, the entering of the backup ring is stably carried out as the outer peripheral surface of the backup ring is brought into contact with the inner surface of the recess of the pump head. However, press fitting needs to be carried out when fitting the backup ring to the recess, and hence, the attachment/detachment of the backup ring with respect to the pump head cannot be easily carried out. Furthermore, when the backup ring is forcedly attached/detached, not only the backup ring but components such as the plunger seal, the pump head, and the like may be damaged.

When the thickness of the backup ring is thinned, the contacting area with the inner surface of the recess of the pump head is reduced and the friction resistance of when attaching/detaching the backup ring to/from the pump head is reduced, and hence, the dimensional difference of the outer diameter of the backup ring and the inner diameter of the recess of the pump head can be designed to be small. However, if the thickness of the backup ring is thinned, the strength becomes lower by such extent, and the backup ring cannot withstand application to high pressure liquid feeding. Thus, there is a limit to thinning the backup ring.

The present invention thus aims to facilitate the attachment/detachment of the backup ring with respect to the pump head and to stabilize the positioning of the backup ring with respect to the pump head without lowering the strength of the backup ring.

A backup ring according to the present invention is for contacting with and supporting a plunger seal which is for sealing a pump chamber provided in a pump head of a plunger type liquid feeding pump. The backup ring comprises a maximum outer diameter portion of a cylindrical shape and a smaller outer diameter portion. The maximum outer diameter portion includes a maximum outer diameter in a plunger seal supporting surface side that makes contact with a rear surface of the plunger seal. The smaller outer diameter portion includes a smaller outer diameter than the maximum outer diameter portion in at least one part of a portion other than the maximum outer diameter portion. In other words, in the backup ring of the present invention, the outer peripheral surface of the maximum outer diameter portion makes contact with the inner surface of the recess of the pump head, to which the backup ring is fitted, whereas the outer peripheral surface of the smaller outer diameter portion does not make contact with the inner surface of the recess of the pump head.

An outer diameter of the maximum outer diameter portion is preferably substantially the same as an inner diameter of a recess formed in the pump head. Thus, the positioning of the backup ring with respect to the pump head is stabilized, and the contact of the inner peripheral surface of the backup ring and the outer peripheral surface of the plunger is suppressed. When the outer diameter of the maximum outer diameter portion is substantially the same as the inner diameter of the recess, this means that the dimensional difference of the outer diameter of the maximum outer diameter portion and the inner diameter of the recess is, for example, smaller than or equal to 0.01 mm.

In one example of a preferred embodiment of the backup ring, the smaller outer diameter portion also has a cylindrical shape. In such embodiment, a step caused by the difference in outer diameter between the plunger seal supporting surface side and the surface on the opposite side thereof is formed on the outer peripheral surface of the backup ring. Such structure can be easily formed through processing by cutting that utilizes rotation, and rises in cost can be suppressed.

In another example of a preferred embodiment of the backup ring, an outer peripheral surface of the smaller outer diameter portion has a tapered shape in which an outer diameter is inclined to become smaller from the plunger seal supporting surface side toward a surface on an opposite side of the plunger seal supporting surface. Such structure can also be easily formed through processing by cutting that utilizes rotation, and rises in cost can be suppressed.

A liquid feeding pump according to the present invention includes a pump head including a liquid inlet for taking in liquid, a pump chamber for storing the liquid taken in from the liquid inlet, and a liquid outlet for discharging the liquid in the pump chamber; a plunger that has a distal end side inserted to the pump head, and that slidably moves in the pump head; a ring shaped plunger seal that is attached to the plunger inserting portion of the pump head and that seals a gap between the pump head and the plunger; and the backup ring of the present invention that is arranged on a rear surface side of the plunger seal to support the rear surface of the plunger seal.

The backup ring according to the present invention includes a maximum outer diameter portion of a cylindrical shape having a maximum outer diameter on a plunger seal supporting surface side and a smaller outer diameter portion having a smaller outer diameter than the maximum outer diameter portion in at least one part of a portion other than the maximum outer diameter portion, where the outer peripheral surface of the maximum outer diameter portion makes contact with the inner surface of the recess of the pump head, to which the backup ring is fitted, whereas the outer peripheral surface of the smaller outer diameter portion does not make contact with the inner surface of the recess of the pump head, whereby the contacting area with the inner surface of the recess of the pump head can be reduced without even thinning the thickness of the backup ring. Thus, the friction resistance of when attaching/detaching the backup ring with respect to the pump head is reduced, the attachment/detachment of the backup ring with respect to the pump head is facilitated, and the maintenance property is enhanced.

Furthermore, as the contacting area with the inner surface of the recess of the pump head is reduced, the increase in the friction resistance of when fitting the backup ring to the recess of the pump head is suppressed even if the outer diameter of the maximum outer diameter portion is brought closer to the inner diameter of the recess of the pump head. When the outer diameter of the maximum outer diameter portion becomes closer to the inner diameter of the recess of the pump head, the positioning of the backup ring with respect to the pump head is stabilized by that much, and the contact of the inner peripheral surface of the backup ring and the outer peripheral surface of the plunger is suppressed.

The liquid feeding pump according to the present invention uses the backup ring described above, and thus, the attachment of the backup ring to the pump head can be easily carried out. Furthermore, when the backup ring in which the outer diameter of the maximum outer diameter portion is closer to the inner diameter of the recess of the pump head is used, the positioning of the backup ring with respect to the pump head is more stably carried out, the contact of the inner peripheral surface of the backup ring and the outer peripheral surface of the plunger is suppressed, and the abrasion of the backup ring, the plunger, and the plunger seal is suppressed.

DETAILED DESCRIPTION

Figure 1A:
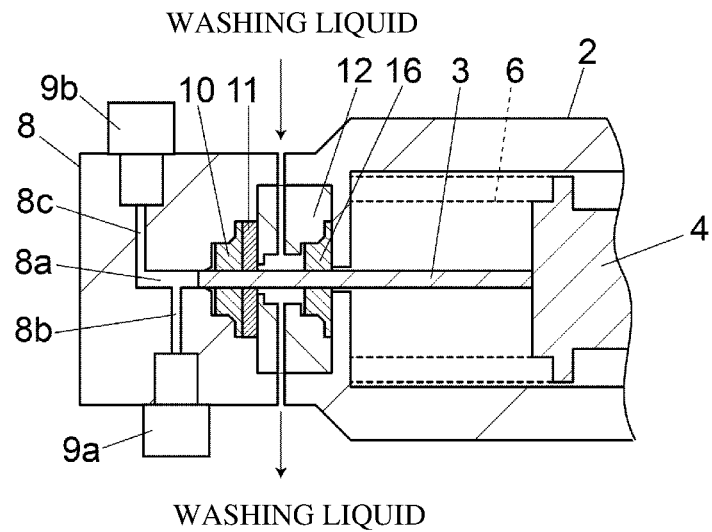
FIG. 1A is a cross-sectional view of a distal end side portion of a pump body showing one example of a liquid feeding pump equipped with a backup ring.
Figure 1B:
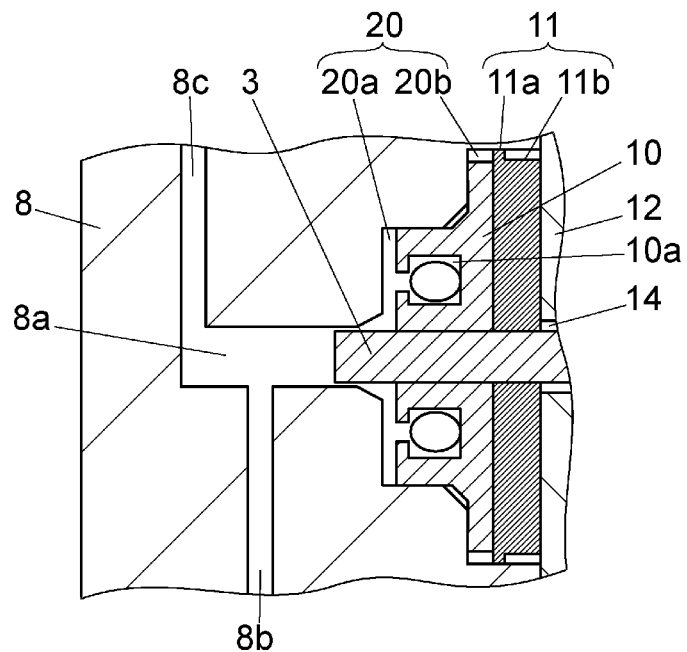
FIG. 1B is a cross-sectional view showing a vicinity of a pump chamber of FIG. 1A in an enlarged manner.

One example of a liquid feeding pump will be described using FIGS. 1A and 1B.

The liquid feeding pump of the present example has a pump head 8 attached to a distal end of a pump body 2 with a washing chamber 12 in between. A cross head 4 is movably accommodated in the pump body 2. The cross head 4 is constantly pushed in a direction (right direction in the figure) of moving away from the pump head 8 by an elastic body 6 such as a spring, and follows a peripheral surface of a cam (not shown) arranged on a basal end portion side of the cross head 4. The cross head 4 is reciprocated in a direction of moving closer to and a direction of moving away from (left and right direction in the figure) the pump head 8 in the pump body 2 by following the peripheral surface of the rotating cam.

A basal end portion of a plunger 3 is held at a distal end of the cross head 4. A distal end portion of the plunger 3 is passed through the washing chamber 12 and inserted to a pump chamber 8a provided inside the pump head 8. The distal end portion of the plunger 3 is slidably moved along a wall surface of the pump chamber 8a by the reciprocating movement of the cross head 4. The pump head 8 includes a liquid inlet flow path 8b for taking in the liquid into the pump chamber 8a, and a liquid outlet flow path 8c for pushing out the liquid from the pump chamber 8a. A check valve 9a, 9b for preventing backflow is connected to the liquid inlet flow path 8b and the liquid outlet flow path 8c, respectively.

A recess 20 communicating to the pump chamber 8a is arranged on the surface on the pump body 2 side of the pump head 8. A plunger seal 10 and a backup ring 11 are fitted to the recess 20 from the pump chamber 8a side. The recess 20 includes a recess 20a for fitting a front surface side portion (left side portion in the figure) of the plunger seal 10 and a recess 20b arranged on the pump body 2 side than the recess 20a and having a larger inner diameter than the recess 20a. A rear surface side portion (right side portion in the figure) of the plunger seal 10 and the backup ring 11 are fitted into the recess 20b.

The plunger seal 10 closely attaches to and holds the outer peripheral surface of the plunger 3 in a slidably moving manner to prevent liquid leakage from a gap between the inner wall of the pump chamber 8a and the peripheral surface of the plunger 3. The backup ring 11 supports the rear surface (surface on the side opposite the pump chamber 8a) of the plunger seal 10. A surface on a side opposite a surface (plunger seal supporting surface) on the plunger seal 10 side of the backup ring 11 is supported by the wall surface of the washing chamber 12. Details of the plunger seal 10 and the backup ring 11 will be described later.

The washing chamber 12 interiorly includes a flow path for flowing washing liquid, and a space for washing the outer peripheral surface of the plunger 3 passed therethrough with the washing liquid. A washing seal 16 that slidably holds the outer peripheral surface of the plunger 3 to prevent leakage of the washing liquid is arranged at the plunger 3 inserting portion of the interior space of the washing chamber 12. The rear surface of the washing seal 16 is supported by the wall surface of the pump body 2.

In the liquid feeding pump, when the plunger 3 is driven in a direction (right direction in the figure) of moving away from the pump chamber 8a, the inside of the pump chamber 8a is depressurized, causing the check valve 9b to close and the check valve 9a to open, so that the liquid is taken in from the liquid inlet flow path 8b into the pump chamber 8a. On the other hand, when the plunger 3 is driven in a direction (left direction in the figure) of being inserted into the pump chamber 8a, the inside of the pump chamber 8a is pressurized, causing the check valve 9a to close and the check valve 9b to open, so that the liquid is pushed out from the pump chamber 8a to the liquid outlet flow path 8c. The liquid is fed by repeating such operation.

The plunger seal 10 is made from an elastic material such as polyethylene resin. A rectangular space 10a, of which pump chamber 8a side is opened, is provided to store the liquid leaked from between the inner wall of the pump chamber 8a and the outer periphery of the plunger 3 at the periphery of the plunger of the plunger seal 10. The space 10a is arranged to a ring shape coaxial with the plunger 3, and has a rectangular cross-sectional shape in the axial direction of the plunger 3. In the present example, a ring shaped elastic member is arranged in the space 10a.

The inner diameter of the backup ring 11 supporting the rear surface of the plunger seal 10 is greater than the inner diameter of the plunger seal 10 and smaller than a hole 14, through which the plunger 3 is passed, in the wall surface of the washing chamber 12 supporting the backup ring 11. The backup ring 11 is a ring shaped member made of, for example, PEEK resin and the like.

The backup ring 11 includes two cylindrical portions: a maximum outer diameter portion 11a and a smaller outer diameter portion 11b. The maximum outer diameter portion 11a is a portion arranged on a plunger seal supporting surface side (left side in the figure), and has a maximum outer diameter in the backup ring 11. The outer diameter of the maximum outer diameter portion 11a is substantially the same as the inner diameter of the recess 20b of the pump head 8, and the outer diameter of the smaller outer diameter portion 11b is smaller than the outer diameter of the maximum outer diameter portion 11a. Thus, a gap is formed between the outer peripheral surface of the smaller outer diameter portion 11b and the inner surface of the recess 20b.

In other words, the outer peripheral surface of the backup ring 11 has a step, where only the peripheral surface on the plunger seal supporting surface side of the outer peripheral surface makes contact with the inner surface of the recess 20b and the other peripheral surface does not make contact with the inner surface of the recess 20b. Thus, the contacting area with the inner surface of the recess 20b becomes smaller than when the entire outer peripheral surface of the backup ring 11 makes contact with the inner surface of the recess 20b, and the friction resistance of when fitting the backup ring 11 to the recess 20b or when detaching the backup ring 11 from the recess 20b is reduced. Therefore, the attachment/detachment of the backup ring 11 with respect to the pump head 8 is facilitated.

The thickness of the backup ring 11 is a thickness which the backup ring 11 has strength to withstand even liquid feeding under a high pressure condition, for example, about 2 mm. Furthermore, the thickness of the maximum outer diameter portion 11a, of which an outer peripheral surface makes contact with the inner surface of the recess 20b to carry out positioning of the backup ring 11, is a thickness that can withstand the deformation pressure from the plunger seal 10 side at the time of liquid feeding under high pressure condition, for example, about 0.9 mm.

The thickness of the maximum outer diameter portion 11a may be arbitrary as long as it is greater than or equal to the thickness that can withstand the deformation pressure from the plunger seal 10 side at the time of liquid feeding under the high pressure condition. However, the thickness of the maximum outer diameter portion 11a is preferably smaller than or equal to 50% of the thickness of the entire backup ring 11 to sufficiently reduce the friction resistance between the inner surface of the recess 20b and the outer peripheral surface of the backup ring 11 and to facilitate the attachment/detachment of the backup ring 11 with respect to the pump head 8.

Furthermore, to stably carry out the positioning of the backup ring 11 with respect to the pump head 8, the dimensional difference of the inner diameter of the recess 20b and the outer diameter of the maximum outer diameter portion 11a is preferably smaller than or equal to 0.01 mm. When the entire outer peripheral surface of the backup ring 11 is brought into contact with the inner surface of the recess 20b, if the dimensional difference of the inner diameter of the recess 20b and the outer diameter of the maximum outer diameter portion 11a is smaller than or equal to 0.01 mm, the friction resistance between the inner surface of the recess 20b and the outer peripheral surface of the backup ring 11 becomes too large, and the attachment/detachment of the backup ring 11 with respect to the pump head 8 becomes difficult, but the design of such dimensional difference can be made by configuring the backup ring 11 with the maximum outer diameter portion 11a and the smaller outer diameter portion 11b as in the present example.

Figure 2:
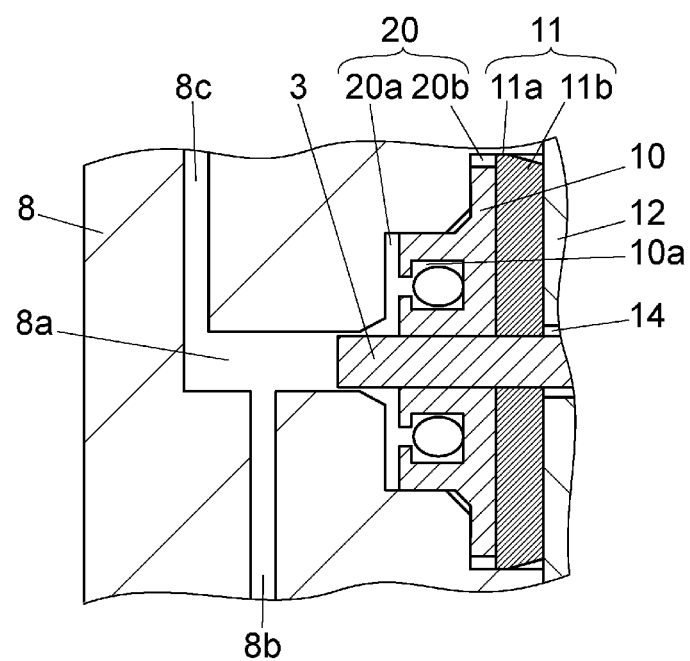
FIG. 2 is a cross-sectional view of a vicinity of a pump chamber of a liquid feeding pump for describing another example of a backup ring.

The structure of the backup ring 11 is not limited to the example described above. For example, as shown in FIG. 2, the outer peripheral surface of the backup ring 11 may be a tapered shape in which the outer diameter is inclined to become smaller from the middle toward the pump body 2 side (right side in the figure). In this case, the portion 11a on the plunger seal supporting surface side (left side in the figure) of the backup ring 11 becomes the maximum outer diameter portion, and the outer diameter of the maximum outer diameter portion 11a is substantially the same as the inner diameter of the recess 20b. The portion on the pump body 2 side rather than the maximum outer diameter portion 11a is the smaller outer diameter portion 11b having a smaller outer diameter than the maximum outer diameter portion 11a.

According to the structure of FIG. 2 as well, similar to the example of FIG. 1, the contacting area with the inner surface of the recess 20b becomes smaller than when the entire outer peripheral surface of the backup ring 11 makes contact with the inner surface of the recess 20b, and the friction resistance of when fitting the backup ring 11 into the recess 20b and detaching the backup ring 11 from the recess 20b is reduced.

The backup ring 11 may be any structure as long as the maximum outer diameter portion 11a having an outer diameter substantially the same as the inner diameter of the recess 20b is arranged on the plunger seal supporting surface side, and the smaller diameter portion having a smaller outer diameter than the maximum outer diameter portion 11a is arranged at the other portions.

The invention claimed is:

1. A liquid feeding pump comprising:
   a pump head including a liquid inlet for taking in liquid, a pump chamber for storing the liquid taken in from the liquid inlet, a liquid outlet for discharging the liquid in the pump chamber, and a recess connecting the liquid inlet and the liquid outlet to the pump chamber;
   a plunger that has a distal end side inserted to the pump head through the recess, and that slidably moves in the pump head;
   a plunger seal that is fitted to the recess of the pump head and that seals a gap between the pump head and the plunger; and
   a backup ring which is fitted to the recess of the pump head and is contacting with and supporting the plunger seal, wherein
   the backup ring comprises:
   a plunger seal supporting surface contacting with the plunger seal, an opposite surface to the plunger seal supporting surface, a length from the plunger seal supporting surface to the opposite surface, an outer peripheral surface extending along the length from the plunger seal support surface to the opposite surface, a maximum outer diameter portion arranged on the plunger seal supporting surface and being a cylindrical shape extending along the length from the plunger seal supporting surface towards the opposite surface to a location along the length, and a smaller outer diameter portion including the opposite surface and extending from the opposite surface along the length to the location to where the maximum outer diameter portion extends,
   the maximum outer diameter portion has an outer diameter substantially the same as an inner diameter of the recess of the pump head, and
   the smaller outer diameter portion has an outer diameter smaller than the outer diameter of the maximum outer diameter portion so that a gap is formed between an inner surface of the recess of the pump head and the outer peripheral surface of the smaller outer diameter portion along the length between the maximum outer diameter portion and the opposite surface.

2. The liquid feeding pump according to claim 1, wherein the smaller outer diameter portion also is a cylindrical shape.

3. The liquid feeding pump according to claim 1, wherein the smaller outer diameter portion is a tapered shape in which an outer diameter at the outer peripheral surface is inclined to become smaller along the length from the maximum diameter portion to the opposite surface.

4. The liquid feeding pump according to claim 1, wherein a thickness of the maximum outer diameter portion is smaller than or equal to 50% of a thickness of the backup ring.

* * * * *